United States Patent Office 3,205,228
Patented Sept. 7, 1965

3,205,228
19-SUBSTITUTED PREGNENES
Albert Bowers, Mexico City, Mexico, assignor to Syntex Corporation, Panama, Panama, a corporation of Panama
No Drawing. Filed Mar. 1, 1963, Ser. No. 262,239
15 Claims. (Cl. 260—239.55)

The present invention relates to novel 19-substituted pregnenes.

More particularly, the present invention relates to novel 19-oxo - $\Delta^4$ - 10α-pregnene-3,20-dione derivatives and to novel 19-oxo-10α-derivatives of cortical hormones.

The novel compounds of the present invention are represented by the following formulae:

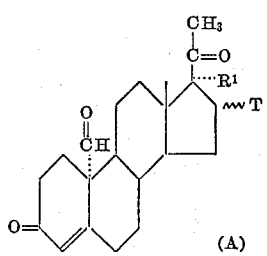
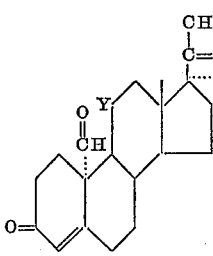

In the above formulae $R^1$ represents hydrogen, hydroxyl or a hydrocarbon carboxylic acyloxy group of less than 12 carbon atoms; T represents hydrogen, α-hydroxy, α-acyloxy, α-methyl or β-methyl; T and $R^1$ together represent the group

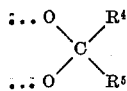

at the 16α,17α-position wherein $R^4$ and $R^5$ each represents hydrogen or a lower hydrocarbon residue of up to 8 carbon atoms, which may be saturated or unsaturated, of straight, branched, cyclic or cyclic-aliphatic chain or aromatic, such as methyl, ethyl, isopropyl, benzyl, phenyl, toluyl, methyl-cyclohexyl, and the like; $R^2$ is hydrogen; $OR^2$ and T together represent the group

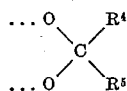

wherein $R^4$ and $R^5$ have the same meaning as defined hereinbefore; $R^3$ represents hydrogen or a hydrocarbon carboxylic acyl group of less than 12 carbon atoms; and Y represents a keto group or a β-hydroxyl group.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by Formula A are powerful progestational agents with good oral activity. In addition they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The compounds represented by Formula B are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders, such as psoriasis, allergic dermatitis and the like.

The novel compounds of the present invention are prepared by the process illustrated by the following formula scheme:

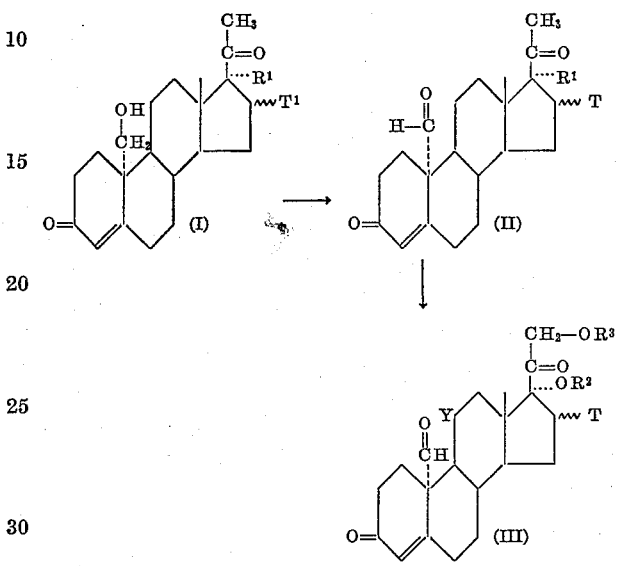

In the above formulae $R^1$, $R^2$, $R^3$, T and Y have the same meaning as set forth hereinbefore; $T^1$ represents the same groups as T, except for α-hydroxyl.

The starting compound (I) of the present process, which is a $\Delta^4$-10α-pregnen-19-ol-3,20-dione derivative, is obtained according to Cross U.S. patent application Serial No. 231,831, filed October 19, 1962, from the corresponding $\Delta^4$-pregnen-19-ol-3,20-dione by hydrogenation of the $\Delta^4$-double bond, tosylation of the resulting allopregnan-19-ol-3,20-dione, treatment of the obtained 19-tosylate with sodium hydride, hydrolysis of the resulting 2,19-cycloallopregnane-3,20-dione in a strong acid or basic medium and finally introduction of a $\Delta^4$-double bond into the obtained 10α-allopregnan-19-ol-3,20-dione by conventional procedures, i.e. successive treatment with bromine, sodium iodide and γ-collidine.

In proceeding in accordance with the above scheme, the starting compound (I) is oxidized with chromium trioxide in pyridine overnight at room temperature, to give the corresponding $\Delta^4$-10α-pregnen-19-al-3,20-dione derivative (II).

The $\Delta^4$-10α-pregnen-19-al-3,20-dione derivatives having a hydroxyl at C-17α or a 16α,17α-ketonide grouping (II: $R^1$=H), are treated with iodine, in the presence of calcium oxide, to give the corresponding 21-iodo derivatives, which upon reaction with potassium acetate in a suitable solvent, such as acetone, under anhydrous conditions, yield the corresponding $\Delta^4$-10α-pregnen-21-ol-19-al-3,20-dione 21-acetates which, in turn, upon incubation with adrenal glands in a suitable medium, e.g. an aqueous solution of alkali metal phosphates and chlorides and magnesium sulfate, mixed with an aqueous solution of fumaric acid and sodium hydroxide for a period of time of the order of 3 hours, at approximately 30° C., yield the corresponding $\Delta^4$-10α-pregnene-11β,21-diol-19-al-3,20-dione compounds (III: $R^3$=H, Y=β-OH). The latter compounds are acylated conventionally in pyridine with an acylating agent, such as acetic anhydride or caproic anhydride to give the corresponding 21-acylates (III: $R^3$=acyl, Y=β-OH), which upon oxidation, preferably with Jones' reagent, afford the corresponding 11-keto-21-acylates (III: $R^3$=acyl, Y=O).

The compound of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a 21-acyloxy group, are saponified by conventional treatment with a base to produce the corresponding 21-free alcohols which, in turn, may be acylated conventionally in pyridine with an acylating agent to give the corresponding 21-acylates, wherein the acyl group may be different from the previously saponified one.

The compounds of the present invention having a 17α-hydroxy group are esterified conventionally in the presence of p-toluene sulfonic acid with an acylating agent, such as acetic anhydride, thus affording the corresponding 17α-acyloxy derivatives.

The following specific examples serve to illustrate but are not intended to limit the scope of the present invention:

Example I

A solution of 6 g. of $\Delta^4$-10α-pregnen-19-ol-3,20-dione (obtained according to Cross U.S. patent application Ser. No. 231,831, filed October 19, 1962), in 120 cc. of pyridine was added to a mixture of 6 g. of chromium trioxide in 120 cc. of pyridine. The reaction mixture was kept at room temperature overnight. It was then diluted with ethyl acetate, filtered through Celite and the filtrate washed well with water, dried and evaporated to dryness. Crystallization from acetone-hexane afforded $\Delta^4$-10α-pregnen-19-al-3,20-dione (Compound No. 1).

The starting compounds listed below under A (obtained according to the aforesaid application or to my copending U.S. patent application Ser. No. 262,237, filed of even date, now abandoned) were treated by the above procedure, thus giving the corresponding products set forth hereinafter under B:

| A | Cpd. No. | B |
|---|---|---|
| 16α-methyl-$\Delta^4$-10α-pregnen-19-ol-3,20-dione. | 2 | 16α-methyl-$\Delta^4$-10α-pregnen-19-al-3,20-dione. |
| 16β-methyl-$\Delta^4$-10α-pregnen-19-ol-3,20-dione. | 3 | 16β-methyl-$\Delta^4$-10α-pregnen-19-al-3,20-dione. |
| 16α,17α-isopropylidene-dioxy-$\Delta^4$-10α-pregnen-19-ol-3,20-dione. | 4 | 16α,17α-isopropylidene-dioxy-$\Delta^4$-10α-pregnen-19-al-3,20-dione. |
| $\Delta^4$-10α-pregnene-17α,19-diol-3,20-dione. | 5 | $\Delta^4$-10α-pregnen-17α-ol-19-al-3,20-dione. |
| 16α-methyl-$\Delta^4$-10α-pregnene-17α,19-diol-3,20-dione. | 6 | 16α-methyl-$\Delta^4$-10α-pregnen-17α-ol-19-al-3,20-dione. |
| 16β-methyl-$\Delta^4$-10α-pregnene-17α,19-diol-3,20-dione. | 7 | 16β-methyl-$\Delta^4$-10α-pregnen-17α-ol-19-al-3,20-dione. |

Example II

A cooled solution of 4 g. of $\Delta^4$-10α-pregnen-17α-ol-19-al-3,20-dione (Cpd. No. 5) in 30 cc. of tetrahydrofuran and 18 cc. of methanol was treated under continuous stirring with 6 g. of pure calcium oxide, in small portions and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding $\Delta^4$-10α-pregnene-17α,21-diol-19-al-3,20-dione 21-acetate (Cpd. No. 8).

Compounds Nos. 6 and 7 were treated following the procedure just described thus giving respectively: 16α-methyl-$\Delta^4$-10α-pregnene-17α,21-diol-19-al-3,20-dione 21-acetate (Cpd. No. 9) and 16β-methyl-$\Delta^4$-10α-pregnene-17α,21-diol-19-al-3,20-dione 21-acetate (Cpd. No. 10).

Example III

The following solutions "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 10.1% magnesium sulfate, to a volume of 5 lt. solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until an homogeneous mass was obtained; to 1 kg. of homogenate was added 2 liters of the mixture of A, B and C solutions with vigorous stirring. To the mixture there was then added 1 g. of compound No. 8, dissolved in 5.35 cc. of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded $\Delta^4$-10α-pregnene-11β,17α,21-triol-19-al-3,20-dione (Cpd. No. 11).

The compounds Nos. 9 and 10 were converted by the same procedure, respectively, into: 16α-methyl-$\Delta^4$-10α-pregnene-11β,17α,21-triol-19-al-3,20-dione (Cpd. No. 12) and 16β-methyl-$\Delta^4$-10α-pregnene-11β,17α,21-triol-19-al-3,20-dione (Cpd. No. 13).

Example IV

The compound No. 4 was successively treated by the procedures described in Examples II and III, thus yielding respectively: 16α,17α - isopropylidenedioxy - $\Delta^4$-10α-pregnen-21-ol-19-al-3,20-dione 21-acetate (Cpd. No. 14) and 16α,17α - isopropylidenedioxy - $\Delta^4$ - 10α-pregnene-11β,21-diol-19-al-3,20-dione (Cpd. No. 15).

Example V

A mixture of 1 g. of compound No. 11, 4 cc. of pyridine and 2 cc. of acetic anhydride was kept at room temperature overnight, poured into ice water, the formed precipitate was filtered, washed with water and dried. Crystallization from acetone-hexane gave $\Delta^4$-10α-pregnene-11β,17α,21-triol-19-al-3,20-dione 21-acetate (Cpd. No. 16).

The compound Nos. 12, 13 and 15 were treated by the same procedure, thus giving respectively: 16α-methyl-$\Delta^4$-10α-pregnene-11β,17α,21-triol-19-al-3,20-dione 21-acetate (Cpd. No. 17), 16β-methyl-$\Delta^4$-10α-pregnene-11β,17α,21-triol-19-al-3,20-dione 21-acetate (Cpd. No. 18) and 16α,17α - isopropylidenedioxy - $\Delta^4$ - 10α-pregnene-11β,21-diol-19-al-3,20-dione 21-acetate (Cpd. No. 19).

Example VI

The compounds Nos. 16 to 19, inclusive, were treated following the procedure described in Example I, producing respectively: $\Delta^4$-10$\alpha$-pregnene-17$\alpha$,21-diol-3,11,20-trione 21-acetate (Cpd. No. 20), 16$\alpha$-methyl-$\Delta^4$-10$\alpha$-pregnene-17$\alpha$,21-diol-19-al-3,11,20-trione 21-acetate (Cpd. No. 21), 16$\beta$-methyl-$\Delta^4$-10$\alpha$-pregnene-17$\alpha$,21-diol-19-al-3,11,20-trione 21-acetate (Cpd. No. 22) and 16$\alpha$,17$\alpha$-isopropylidenedioxy-$\Delta^4$-10$\alpha$-pregnen-21-ol-19-al-3,11,20-trione 21-acetate (Cpd. No. 23).

Example VII

A suspension of 1 g. of compound No. 20 in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield $\Delta^4$-10$\alpha$-pregnene-17$\alpha$,21-diol-19-al-3,11,20-trione (Cpd. No. 24).

The compounds Nos. 21 to 23, inclusive, were treated by the above procedure, thus yielding respectively: 16$\alpha$-methyl-$\Delta^4$-10$\alpha$-pregnene-17$\alpha$,21-diol-19-al-3,11,20-trione (Cpd. No. 25), 16$\beta$-methyl-$\Delta^4$-10$\alpha$-pregnene-17$\alpha$,21-diol-19-al-3,11,20-trione (Cpd. No. 26) and 16$\alpha$,17$\alpha$-isopropylidenedioxy-$\Delta^4$-10$\alpha$-pregnene-21-ol-19-al-3,11,20-trione (Cpd. No. 27).

Example VIII

The compounds Nos. 11, 12, 13, 15, 24, 25, 26 and 27 were treated following exactly the procedure described in Example V except that acetic anhydride was substituted by caproic anhydride, propionic anhydride, enanthic anhydride and cyclopentylpropionic anhydride thus affording respectively the corresponding 21-caproates, 21-propionates, 21-enanthates and 21-cyclopentylpropionates of said compounds.

Example IX

To a solution of 5 g. of $\Delta^4$-10$\alpha$-pregnen-17$\alpha$-ol-19-al-3,20-dione (Cpd. No. 5) in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced $\Delta^4$-10$\alpha$-pregnen-17$\alpha$-ol-19-al-3,20-dione caproate (Cpd. No. 28).

The compounds Nos. 6 and 7, were treated by the same procedure, thus yielding respectively: 16$\alpha$-methyl-$\Delta^4$-10$\alpha$-pregnen-17$\alpha$-ol-19-al-3,20-dione caproate (Cpd. No. 29) and 16$\beta$-methyl-$\Delta^4$-10$\alpha$-pregnen-17$\alpha$-ol-19-al-3,20-dione caproate (Cpd. No. 30).

Example X 1 g. of 16$\alpha$,17$\alpha$-isopropylidenedioxy-$\Delta^4$-10$\alpha$-pregnen-19-al-3,20-dione (Cpd. No. 4) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane to give $\Delta^4$-10$\alpha$-pregnene-16$\alpha$,17$\alpha$-diol-19-al-3,20-dione (Cpd. No. 31).

When applying the latter technique to compounds Nos. 15, 19, 23 and 27 there were respectively produced:

Cpd. No.—
- 32. $\Delta^4$-10$\alpha$-pregnene-11$\beta$,16$\alpha$,17$\alpha$,21-tetrol-19-al-3,20-dione.
- 33. $\Delta^4$-10$\alpha$-pregnene-11$\beta$,16$\alpha$,17$\alpha$,21-tetrol-19-al-3,20-dione 21-acetate.
- 34. $\Delta^4$-10$\alpha$-pregnene-16$\alpha$,17$\alpha$,21-triol-19-al-3,11,20-trione 21-acetate.
- 35. $\Delta^4$-10$\alpha$-pregnene-16$\alpha$,17$\alpha$,21-triol-19-al-3,11,20-trione.

Example XI

The starting compounds of Example IX were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

Example XII

The compound No. 31 was treated according to Examples V and IX, thus yielding respectively:

Cpd. No.—
- 36. $\Delta^4$-10$\alpha$-pregnene-16$\alpha$,17$\alpha$-diol-19-al-3,20-dione 16-acetate.
- 37. $\Delta^4$-10$\alpha$-pregnene-16$\alpha$,17$\alpha$-diol-19-al-3,20-dione dicaproate.

Example XIII

The compounds Nos. 32 and 35, inclusive, were treated according to Example V except that acetic anhydride was substituted by propionic anhydride thus yielding respectively:

Cpd. No.—
- 38. $\Delta^4$-10$\alpha$-pregnene-11$\beta$,16$\alpha$,17$\alpha$,21-tetrol-19-al-3,20-dione 16,21-dipropionate.
- 39. $\Delta^4$-10$\alpha$-pregnene-11$\beta$,16$\alpha$,17$\alpha$,21-tetrol-19-al-3,20-dione 16-propionate-21-acetate.
- 40. $\Delta^4$-10$\alpha$-pregnene-16$\alpha$,17$\alpha$,21-triol-19-al-3,11,20-trione 16-propionate-21-acetate.
- 41. $\Delta^4$-10$\alpha$-pregnene-16$\alpha$,17$\alpha$,21-triol-19-al-3,11,20-trione 16,21-dipropionate.

Example XIV

A solution of 500 mg. of compound No. 31 in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16$\alpha$,17$\alpha$-ethylidenedioxy-$\Delta^4$-10$\alpha$-pregnen-19-al-3,20-dione (Cpd. No. 42).

The compound No. 32 was treated by the above procedure to give 16$\alpha$,17$\alpha$-ethylidenedioxy-$\Delta^4$-10$\alpha$-pregnene-11$\beta$,21-thiol-19-al-3,20-dione (Cpd. No. 43).

Example XV

A mixture of 1 g. of compound No. 31, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded $\Delta^4$-10$\alpha$-pregnene-16$\alpha$,17$\alpha$-diol-19-al-3,20-dione-16,17-acetophenonide (Cpd. No. 44).

The compound No. 35 was treated by the above procedure, thus yielding $\Delta^4$-10$\alpha$-pregnene-16$\alpha$,17$\alpha$,21-triol-19-al-3,11,20-trione 16,17-acetophenonide (Cpd. No. 45).

I claim:

1. A compound of the following formula:

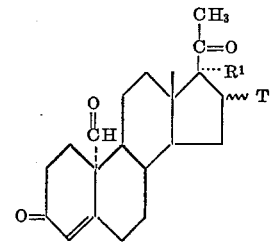

wherein R¹ is selected from the group consisting of hydrogen, hydroxyl, and a hydrocarbon carboxylic acyloxy group of less than 12 carbon atoms; T is a member of the group consisting of α-hydroxy, α-hydrocarbon carboxylic acyloxy of less than 12 carbon atoms, α-methyl and β-methyl; T and R¹ together represent the group

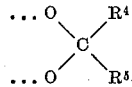

wherein R⁴ and R⁵ are selected from the group consisting of hydrogen and a lower hydrocarbon residue of up to 8 carbon atoms.

2. A compound of the following formula:

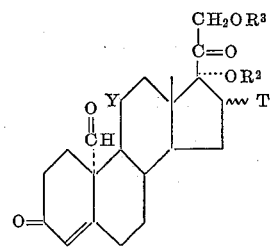

wherein R³ is selected from the group consisting of hydrogen and a hydrocarbon carboxylic acyl group of less than 12 carbon atoms; T is a member of the group consisting of hydrogen, α-hydroxy, α-hydrocarbon carboxylic acyloxy of less than 12 carbon atoms, α-methyl and β-methyl; R² is hydrogen; T and —OR² together represent the group

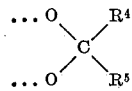

wherein R⁴ and R⁵ are selected from the group consisting of hydrogen and a lower hydrocarbon residue of up to 8 carbon atoms; and Y is a member of the group consisting of β-hydroxyl and keto.

3. 16α-methyl-Δ⁴-10α-pregnen-19-al-3,20-dione.
4. 16β-methyl-Δ⁴-10α-pregnen-19-al-3,20-dione.
5. 16α,17α-isopropylidenedioxy - Δ⁴ - 10α - pregnen-19-al-3,20-dione.
6. 16α-methyl-Δ⁴-10α-pregnen - 17α - ol - 19 - al - 3,20-dione.
7. 16β-methyl-Δ⁴-10α-pregnen - 17α - ol - 19 - al - 3,20-dione.
8. Δ⁴-10α-pregnene-11β,17α,21-triol-19-al-3,20-dione.
9. 16α-methyl-Δ⁴-10α-pregnene-11β,17α,21 - triol - 19-al-3,20-dione.
10. 16β-methyl-Δ⁴-10α-pregnene-11β,17α,21 - triol - 19-al-3,20-dione.
11. 16α,17α-isopropylidenedioxy - Δ⁴ - 10α - pregnene-11β,21-diol-19-al-3,20-dione.
12. Δ⁴-10α-pregnene - 17α,21 - diol - 19 - al - 3,11,20-trione.
13. 16α-methyl-Δ⁴-10α-pregnene-17α,21 - diol - 19 - al-3,11,20-trione.
14. 16β-methyl-Δ⁴-10α-pregnene-17α,21 - diol - 19 - al-3,11,20-trione.
15. 16α,17α-isopropylidenedioxy - Δ⁴ - 10α - pregnen-21-ol-19-al-3,11,20-trione.

References Cited by the Examiner

UNITED STATES PATENTS 3,014,931  12/61  Nishikawa et al. _____ 260—397.1

OTHER REFERENCES

Castells et al.: J. Chem. Loc., pp. 2907–2916 (1962).
Fieser et al.: Steroids, pp. 136–143 and 597 (1959), Reinhold Publishing Co., N.Y.
Sondheimer et al.: Tetrahedron Letters, 22 pp., 38–44 (1960).
Wengler et al.: Helv. Chim. Acta, 45 pp., 2420–2426 (1962).

LEWIS GOTTS, *Primary Examiner.*

WALTER A. MODANCE, *Examiner.*